US012085250B2

(12) United States Patent
Jung et al.

(10) Patent No.: US 12,085,250 B2
(45) Date of Patent: Sep. 10, 2024

(54) LIGHTING APPARATUS FOR VEHICLES AND METHOD OF MANUFACTURING THE SAME PRELIMINARY CLASS

(71) Applicants: Hyundai Motor Company, Seoul (KR); Kia Corporation, Seoul (KR)

(72) Inventors: Woo Chul Jung, Bucheon-Si (KR); Choon Ho Lee, Hwaseong-Si (KR); Jae Kun Lee, Hwaseong-Si (KR); Min Jin Choi, Bucheon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/196,315

(22) Filed: May 11, 2023

(65) Prior Publication Data
US 2024/0230048 A1 Jul. 11, 2024

(30) Foreign Application Priority Data
Jan. 9, 2023 (KR) .................. 10-2023-0002677

(51) Int. Cl.
| | |
|---|---|
| *F21S 41/20* | (2018.01) |
| *B60R 19/52* | (2006.01) |
| *F21S 41/24* | (2018.01) |
| *F21W 104/00* | (2018.01) |
| *F21Y 115/10* | (2016.01) |

(52) U.S. Cl.
CPC .............. *F21S 41/28* (2018.01); *B60R 19/52* (2013.01); *B60R 2019/525* (2013.01); *F21S 41/24* (2018.01); *F21W 2104/00* (2018.01); *F21Y 2115/10* (2016.08)

(58) Field of Classification Search
CPC ........... F21S 41/28; F21S 41/24; B60R 19/52; B60R 2019/525; F21W 2104/00; F21Y 2115/10
See application file for complete search history.

(56) References Cited

U.S. PATENT DOCUMENTS 4,816,968 A * 3/1989 Yamada ................. F21S 43/245
362/310
6,986,597 B2 1/2006 Elwell
(Continued)

FOREIGN PATENT DOCUMENTS

| | | |
|---|---|---|
| CN | 212565622 U | 2/2021 |
| JP | H 05-072593 U | 10/1993 |

(Continued)

*Primary Examiner* — Elmito Breval
(74) *Attorney, Agent, or Firm* — MORGAN, LEWIS & BOCKIUS LLP (57) ABSTRACT

A lighting apparatus for vehicles which may provide a unique and beautiful image of an electrified vehicle and aesthetic sensibility, and a method of manufacturing the same, include a light source configured to emit light, a light guide plate configured to diffuse the light emitted by the light source, and a lens cover configured to transmit the light diffused by the light guide plate and to emit the light forwards of the light cover, and irregularities configured to form thickness differences of the lens cover depending on a position on the lens cover or a portion of the lens cover are formed on an internal surface of the lens cover configured so that light having passed through the light guide plate is incident thereupon.

20 Claims, 7 Drawing Sheets

(56) References Cited

U.S. PATENT DOCUMENTS

2005/0003159 A1\*   1/2005   Ikeda ........................ F21V 3/04
                                                                428/156
2014/0071703 A1\*   3/2014   Motomura .............. F21S 43/33
                                                                362/511

FOREIGN PATENT DOCUMENTS

| JP | 2019-192399 A | 10/2019 |
|----|---------------|---------|
| KR | 930003997 Y | 6/1993 |
| KR | 2002-0005452 A | 1/2002 |
| KR | 2021-0048819 A | 5/2021 |
| KR | 2022-0100457 A | 7/2022 |

\* cited by examiner

LIGHT

LIGHTING APPARATUS FOR VEHICLES AND METHOD OF MANUFACTURING THE SAME PRELIMINARY CLASS

CROSS-REFERENCE TO RELATED APPLICATION

The present application claims priority to Korean Patent Application No. 10-2023-0002677 filed on Jan. 9, 2023, the entire contents of which is incorporated herein for all purposes by this reference.

BACKGROUND OF THE PRESENT DISCLOSURE

Field of the Present Disclosure

The present disclosure relates to a lighting apparatus for vehicles and a method of manufacturing the same. More particularly, it relates to a lighting apparatus for vehicles which may impart a distinctive image and aesthetic quality to an electrified vehicle, and a method of manufacturing the same.

DESCRIPTION OF RELATED ART

In general, a radiator grill (hereinafter, referred to as "grill") of a vehicle is mounted on the front surface of the front end of a vehicle body, such as a front bumper, and the grill and a front bumper grill provided thereunder provide openings through which outdoor air is introduced into the front end of the vehicle body.

The grill serves as a vent provided at the front end of the vehicle body so that the outdoor air is introduced into a radiator and a condenser through the vent, and further contributes greatly to improvement of the external image of the vehicle and styling of the vehicle in addition to these original functions of the grill.

Recently, vehicles are being changed from internal combustion engine vehicles to electrified vehicles, such as electric vehicles and fuel cell electric vehicles, and from manned vehicles to autonomous vehicles.

Accordingly, the ratio of the original functions of the grill, i.e., outdoor air inflow and cooling functions, is gradually decreased. Instead, the original functions of the grill tend to be replaced with a function as an external structure without an opening on the front end of the vehicle body and a function as an external structure configured to improve aerodynamics.

Conventionally, as an external structure replacing the grill provided on the front end of the vehicle body, a dummy grill having a plain design was applied, or an external structure which closes a region provided as the opening of the grill and is simply surface-treated, such as painted with the same color as the color of the vehicle body, was applied.

In connection therewith, as the needs of the market are changed from internal combustion vehicles to electrified vehicles, demand for lighting apparatuses, which may be mounted on the external surfaces of vehicles to implement images of the electrified vehicles and to improve aesthetic sensibility, is also increased.

Research and development to provide a lighting function to external structures, external panels, charging doors, emblems, etc. disposed at the positions of grills provided on the front ends of vehicles are underway. Furthermore, in case of the lighting functions, demand for various functions, such as a welcome function, a state of charge (SOC) display function, etc., is increasing.

In view of these points, a lighting apparatus which may show a unique and beautiful image of an electrified vehicle, and a lighting apparatus having a new configuration which may implement various lighting functions required by an electrified vehicle are required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a lighting apparatus for vehicles which may implement lighting configured to provide a unique and beautiful image of an electrified vehicle and aesthetic sensibility, and a method of manufacturing the same.

Various aspects of the present disclosure are directed to providing a lighting apparatus for vehicles which may be provided outside or inside a vehicle, may improve a degree of freedom in design, may be manufactured through a simple process, and may implement hidden-type three-dimensional pattern gradation lighting, and a method of manufacturing the same.

Various aspects of the present disclosure are directed to providing a lighting apparatus for vehicles including a light source configured to emit light, a light guide plate configured to diffuse the light emitted by the light source, and a lens cover configured to transmit the light diffused by the light guide plate and to emit the light forwards of the light cover, wherein irregularities configured to form thickness differences of the lens cover depending on a position on the lens cover or a portion of the lens cover are formed on an internal surface of the lens cover configured so that the light having passed through the light guide plate is incident thereupon, to vary an amount of the light transmitted by the lens cover depending on the position or the portion of the lens cover.

In an exemplary embodiment of the present disclosure, the lens cover may be formed of a material including a light-transmissive synthetic resin and a black pigment.

In another exemplary embodiment of the present disclosure, total transmittance of the lens cover may be 10% to 70%.

In yet another exemplary embodiment of the present disclosure, the black pigment may be carbon black, and a content of the carbon black may be 0.01 wt % to 0.5 wt % with respect to a total weight of the material used to manufacture the lens cover by injection molding.

In yet another exemplary embodiment of the present disclosure, the lens cover may be manufactured by injection molding.

In still yet another exemplary embodiment of the present disclosure, an edge pattern configured so that the irregularities are repeated may be formed on the internal surface of the lens cover, the edge pattern may have a structure configured so that prominences including a shape configured to protrude from an internal portion of the lens cover and depressions including a shape recessed between neighboring ones of the prominences are repeated, and at least one of the prominences or the depressions may have a sharp edge-shaped cross section.

In a further exemplary embodiment of the present disclosure, deepest end portions of the depressions may include the sharp edge-shaped cross section.

In another further exemplary embodiment of the present disclosure, protruding end portions of the prominences may include a sharp peak-shaped cross section, or may include a peak-shaped cross section including a flat surface so that the prominences have a constant thickness.

In yet another further exemplary embodiment of the present disclosure, the internal surface of the lens cover may be divided into a plurality of regions, boundaries between neighboring regions among the plurality of regions of the internal surface of the lens cover may correspond to end portions of the prominences including a greatest thickness of the lens cover, and the lens cover may have different thicknesses depending on a position in an internal portion of each of the regions.

In yet another further exemplary embodiment of the present disclosure, the internal portion of each of the regions may have an inclined surface on a cross section thereof to have different thicknesses depending on the position in the internal portion of each of the regions.

Various aspects of the present disclosure are directed to providing a method of manufacturing a lighting apparatus for vehicle, the method including manufacturing a lens cover by injection molding, disposing a light guide plate configured to diffuse light emitted by a light source configured to emit the light, in front of the light source, and disposing the lens cover configured to transmit the light diffused by the light guide plate and to emit the light forwards of the light cover, in front of the light guide plate, wherein, in manufacturing the lens cover, the lens cover is manufactured by injection molding so that irregularities are formed on an internal surface of the lens cover configured so that the light having passed through the light guide plate is incident thereupon, to vary an amount of the light transmitted by the lens cover manufactured by the injection molding depending on a position on the lens cover or a portion of the lens cover.

In an exemplary embodiment of the present disclosure, in manufacturing the lens cover, the lens cover may be manufactured by the injection molding using a material including a synthetic resin configured to be formed into a light-transmissive injection-molded product, and a black pigment.

In another exemplary embodiment of the present disclosure, in manufacturing the lens cover, the lens cover may be manufactured by the injection molding to have total transmittance of 10% to 70%.

In yet another exemplary embodiment of the present disclosure, the black pigment may be carbon black, and a content of the carbon black may be 0.01 wt % to 0.5 wt % with respect to a total weight of the material used to manufacture the lens cover by the injection molding.

In yet another exemplary embodiment of the present disclosure, in manufacturing the lens cover, the lens cover may be manufactured by the injection molding so that an edge pattern configured so that the irregularities are repeated is formed on the internal surface of the lens cover, the edge pattern includes a structure configured so that prominences including a shape configured to protrude from an internal portion of the lens cover and depressions including a shape recessed between neighboring ones of the prominences are repeated, and at least one of the prominences or the depressions includes a sharp edge-shaped cross section.

In still yet another exemplary embodiment of the present disclosure, deepest end portions of the depressions may include the sharp edge-shaped cross section.

In a further exemplary embodiment of the present disclosure, protruding end portions of the prominences may include a sharp peak-shaped cross section, or may include a peak-shaped cross section including a flat surface so that the prominences have a constant thickness.

In another further exemplary embodiment of the present disclosure, in manufacturing the lens cover, the lens cover may be manufactured by the injection molding so that the internal surface of the lens cover is divided into a plurality of regions, boundaries between neighboring regions among the plurality of regions of the internal surface of the lens cover correspond to end portions of the prominences including a greatest thickness of the lens cover, and the lens cover has different thicknesses depending on a position in an internal portion of each of the regions.

In yet another further exemplary embodiment of the present disclosure, the internal portion of each of the regions may have an inclined surface on a cross section thereof to have different thicknesses depending on the position in the internal portion of each of the regions.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Other aspects and exemplary embodiments of the present disclosure are discussed infra.

The above and other features of the present disclosure are discussed infra.

It should be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter reference will be made in detail to various embodiments of the present disclosure, examples of which are illustrated in the accompanying drawings and described below. Specific structural or functional descriptions in embodiments of the present disclosure set forth in the description which follows will be exemplarily provided to describe the exemplary embodiments of the present disclosure, and the present disclosure may be embodied in many alternative forms. Furthermore, it will be understood that the present disclosure should not be construed as being limited to the exemplary embodiments set forth herein, and the exemplary embodiments of the present disclosure are provided only to completely include the present disclosure and cover modifications, equivalents or alternatives which come within the scope and technical range of the present disclosure.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the present disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

Wherever possible, the same reference numbers will be used throughout the drawings to refer to the same or like parts. The terminology used herein is for describing various exemplary embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Various embodiments of the present disclosure relates to a lighting apparatus which may be mounted in an electrified vehicle to implement lighting configured to provide a unique and beautiful image of the electrified vehicle and aesthetic sensibility, and a method of manufacturing the same. The present disclosure is applicable not only to electrified vehicles but also to conventional internal combustion engine vehicles.

The lighting apparatus according to an exemplary embodiment of the present disclosure may be provided outside or inside a vehicle, and may be configured to be manufactured through a simple process, to improve a degree of freedom in design of the outside or interior of the vehicle, and to implement hidden-type three-dimensional pattern gradation lighting. For the present purpose, the lighting apparatus according to an exemplary embodiment of the present disclosure includes a lens cover which may implement the hidden-type three-dimensional pattern gradation lighting.

For example, the lighting apparatus according to an exemplary embodiment of the present disclosure may be an external lighting apparatus which is mounted outside a vehicle to provide a lighting function, or may be an external lighting apparatus which is mounted on an electrified vehicle.

Furthermore, the lighting apparatus according to an exemplary embodiment of the present disclosure may be provided on the front surface of the front end portion of a vehicle body or the rear surface of the rear end portion of the vehicle body, and the position of the front surface of the front end portion of the vehicle body may be the position of a radiator grill of a conventional internal combustion engine vehicle.

That is, the lighting apparatus may be provided at the position of the radiator grill on the front surface of the front end portion of the vehicle body to emit light in a surface emitting-type in an electrified vehicle which requires no opening for outdoor air inflow, such as an electric vehicle or a fuel cell electric vehicle, i.e., corresponding to the position of the radiator grill of the conventional internal combustion engine vehicle.

As described above, the lighting apparatus according to an exemplary embodiment of the present disclosure may be provided at a position on the front surface of the vehicle body or a position on the rear surface of the vehicle body in the electrified vehicle, such as an electric vehicle or a fuel cell electric vehicle, or may be provided inside the vehicle, i.e., at the position of a crash pad or a garnish, to provide light in a surface emitting-type.

When the above-described lighting apparatus according to an exemplary embodiment of the present disclosure is provided at the position on the front surface of the front end portion of the vehicle body, corresponding to the position of the radiator grill, of the conventional internal combustion engine vehicle, a separate opening configured to receive outdoor air in the electrified vehicle may be provided under the lighting apparatus provided at the position of the radiator grill. For example, the opening configured to receive outdoor air may be formed under a front bumper of the front end portion of the vehicle body.

An electric vehicle or a fuel cell electric vehicle also requires heat exchange between outdoor air and a coolant or between outdoor air and a refrigerant to perform exothermic or endothermic reaction in a cooling module, such as a radiator or a condenser, among elements of a thermal management system for vehicles, and thus requires a separate opening formed at the front end portion of a vehicle body to receive outdoor air, and the opening may be separately formed under the lighting apparatus provided at the position of the radiator grill.

The lighting apparatus according to an exemplary embodiment of the present disclosure may implement a lighting pattern configured so that light with a large area emitted from a light source passes through a light guide plate and is emitted in a surface emitting-type through the surface of the lighting apparatus, and may adjust the total transmittances of respective parts of a lens cover, which is an injection-molded product, to implement the surface emitting-type lighting pattern on the surface of the lighting apparatus, being configured for implementing a hidden-type three-dimensional gradation lighting pattern.

Figure 1:
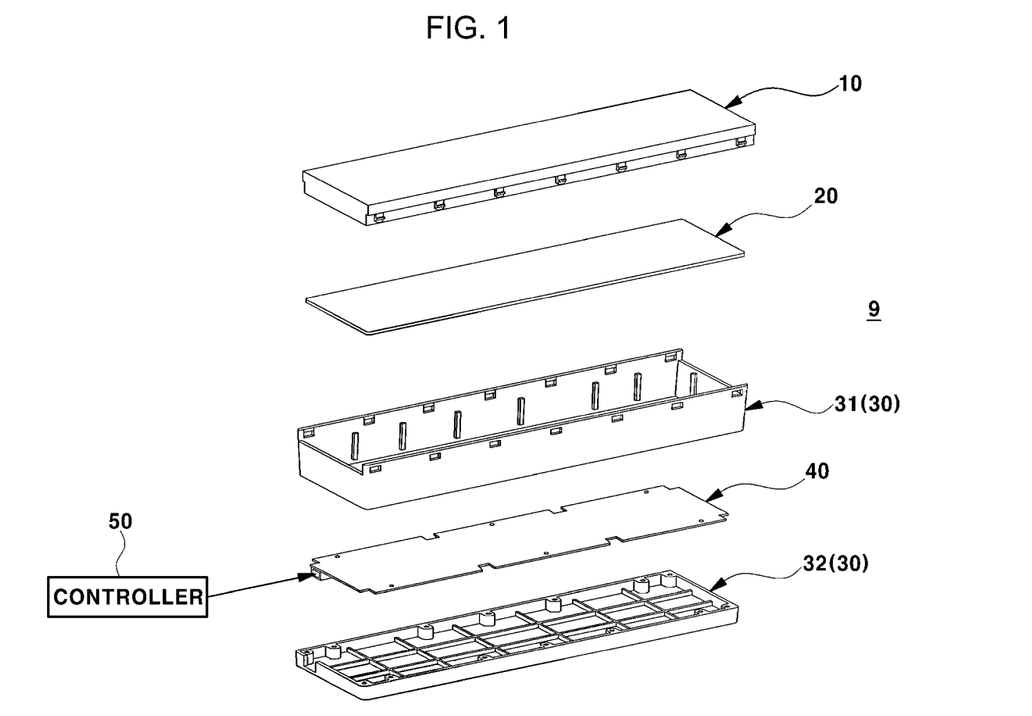
FIG. 1 is an exploded perspective view showing the configuration of a lighting apparatus according to an exemplary embodiment of the present disclosure.
Figure 2:
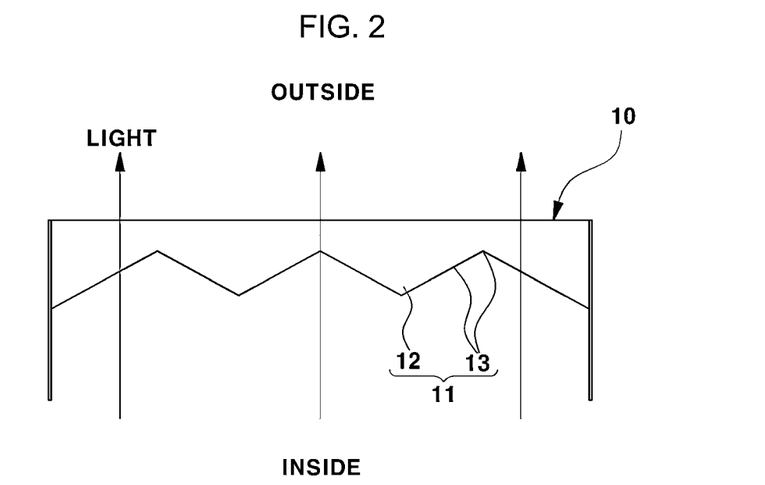
FIG. 2 and FIG. 3 are enlarged longitudinal-sectional views showing examples of the sectional shape of a lens cover of the lighting apparatus according to an exemplary embodiment of the present disclosure.
Figure 3:
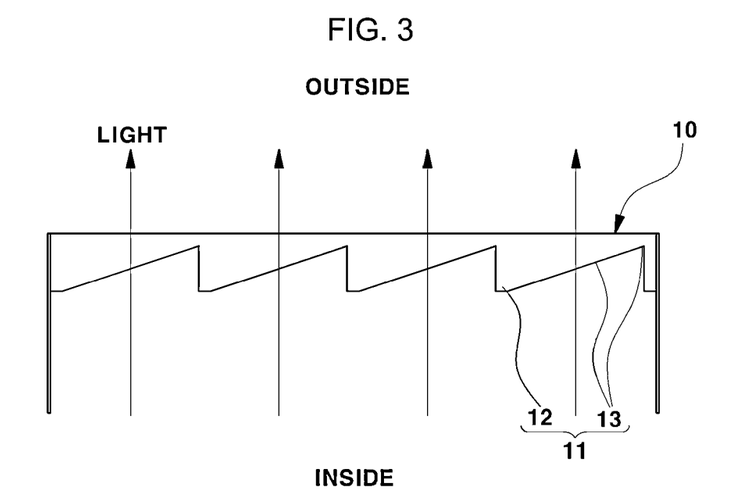

FIG. 1 is an exploded perspective view showing the configuration of a lighting apparatus 9 according to various exemplary embodiments of the present disclosure, and FIG. 2 and FIG. 3 are enlarged longitudinal-sectional views showing examples of the sectional shape of a lens cover 10 of the lighting apparatus 9 according to various exemplary embodiments of the present disclosure.

As shown in FIG. 1, the lighting apparatus 9 according to various exemplary embodiments of the present disclosure implements surface emitting-type lighting, and may include the lens cover 10, a light guide plate 20, and a light source 40.

Furthermore, the lighting apparatus 9 according to various exemplary embodiments of the present disclosure may further include a case 30 configured so that the lens cover 10, the light guide plate 20, and the light source 40 are coupled thereto and mounted therein, and a controller 50 configured to control operation of the light source 40.

Among the elements of the lighting apparatus 9 according to various exemplary embodiments of the present disclosure, the lens cover 10 is disposed at the position of the front surface of the lighting apparatus 9 so that light emitted by the light source 40 passes through the light guide plate 20 and is then finally transmitted by the lens cover 10, and is an external portion provided as the surface of the lighting apparatus 9 which provides light.

Furthermore, in the lighting apparatus 9 according to various exemplary embodiments of the present disclosure, the lens cover 10 is an external portion which visually provides hidden-type lighting and a three-dimensional gradation lighting pattern, as viewed from the front.

In various exemplary embodiments of the present disclosure, to implement the hidden-type lighting and the three-dimensional gradation lighting pattern, the lens cover 10 may be a light-transmitting injection-molded product in which colors are mixed using a black pigment. That is, the lens cover 10 may be manufactured by injection molding using a synthetic resin material to which the black pigment is added.

Here, the three-dimensional gradation lighting pattern may be implemented simply by manufacturing the lens cover 10 by injection molding without any post-treatment process of the lens cover 10, such as plating, coating, or other surface treatments.

For the present purpose, the lens cover 10 is configured so that the total transmittances of respective positions on the lens cover 10 or respective portions of the lens cover 10 are varied by differently setting the thicknesses of the positions or the portions of the lens cover 10 i.e., the injection-molded product, being configured for implementing the three-dimensional gradation lighting pattern.

At the time of manufacturing the lens cover 10 by injection molding, the lens cover 10 is manufactured so that the respective positions on the lens cover 10 or the respective portions of the lens cover 10 have different thicknesses, and the total transmittances of the positions or the portions of the lens cover 10 may be adjusted due to the different thicknesses of the portions of the lens cover 10.

As shown in FIG. 2 and FIG. 3, in the sectional structure of the lens cover 10, the internal portion of the lens cover 10 based on the lighting apparatus 9 will be referred to as a rear portion of the lens cover 10, and the internal surface (i.e., the surface of the internal part) of the lens cover 10 will be referred to as a rear surface of the lens cover 10. Furthermore, the external portion of the lens cover 10 based on the lighting apparatus 9 will be referred to as a front portion of the lens cover 10, and the external surface (i.e., the surface of the external part) of the lens cover 10 will be referred to as a front surface of the lens cover 10.

The front and the rear of the lens cover 10 may be defined based on the traveling direction of light, when the light guide plate 20 and the light source 40 are located behind the lens cover 10 and light emitted by the light source 40 located in the rear is transmitted by the lens cover 10 located in front, and therefore, the anterior portion of the lens cover 10 in the traveling direction of light will be referred to as the front portion of the lens cover 10, and the posterior portion of the lens cover 10 in the traveling direction of light will be referred to as the rear portion of the lens cover 10.

Therefore, light emitted by the light guide plate 20 is incident upon the rear surface of the lens cover 10, is transmitted by the lens cover 10, and is then discharged forwards from the front surface of the lens cover 10.

In an exemplary embodiment of the present disclosure, the lens cover 10 is manufactured by injection molding so that the lens cover 10 has a shape with different thicknesses at the respective positions or the respective portions thereof (a shape having thickness variations) due to an uneven shape of the rear portion of the lens cover 10. Here, an edge pattern 11 in which irregularities are repeated at predetermined intervals may be formed on the rear portion of the lens cover 10 to form the thickness variations between the positions or the portions of the lens cover 10.

Referring to FIG. 2 and FIG. 3, it may be confirmed that the edge pattern 11 in which the irregularities having an edge-shaped cross section are repeated is formed on the rear surface of the lens cover 10 of the lighting apparatus 9 to vary the thickness of the lens cover 10 depending on the position or the portion of the rear surface of the lens cover 10.

In various exemplary embodiments of the present disclosure, the rear surface of the lens cover 10 may be divided into a plurality of regions C having a fixed area, and on the assumption that the respective regions C forming the rear surface of the lens cover 10 are referred to as cells C, the thickness of the lens cover 10 at the boundaries B between neighboring cells C is the greatest, and the thickness of the lens cover 10 may be varied depending on a position in the internal portion of each of the cells C.

Like this, in an exemplary embodiment of the present disclosure, the lens cover 10 may be formed so that the thickness of the lens cover 10 is varied depending on the position in the internal portion of each of the cells C, i.e., the lens cover 10 has a shape with thickness variations in the internal portion of each of the cells C, and in the instant case, the lens cover 10 may be formed so that the internal portion of each of the cells C of the lens cover 10 has an inclined surface on the cross section thereof.

Furthermore, the edge pattern 11 formed on the rear surface of the lens cover 10 may have an uneven structure with an edge-shaped cross section, in which mountain-shaped prominences 12 and depressions 13 corresponding to valley-shaped portions provided between neighboring prominences 12 are repeated, as shown in FIG. 2.

Furthermore, in the uneven structure, the deepest end portions of the respective depressions 13 recessed in the rear portion of the lens cover 10 may have a sharp edge-shaped cross section. The deepest end portions of the depressions 13 are portions of the lens cover 10 having the smallest thickness.

The end portions, i.e., the peak portions, of the respective mountain-shaped prominences 12 may also include a sharp peak-shaped cross section, as shown in FIG. 2. The peak portions of the prominences 12 are portions of the lens cover 10 including the greatest thickness.

Otherwise, the lens cover 10 may be manufactured by injection molding so that the peak portions of the respective prominences 12, i.e., the boundaries B including the greatest thickness between the cells C, of the lens cover 10 include a peak-shaped cross section including a flat surface, as shown in FIG. 3, rather than the sharp peak-shaped cross section, as shown in FIG. 2, and in the instant case, the boundaries B may have a constant thickness.

Accordingly, in an exemplary embodiment of the present disclosure, the thickness of the lens cover 10, which is the injection-molded product, is varied depending on the portion of the lens cover 10, thus being configured for visually implementing a three-dimensional gradation lighting pattern on the front surface of the lens cover 10.

Figure 4:
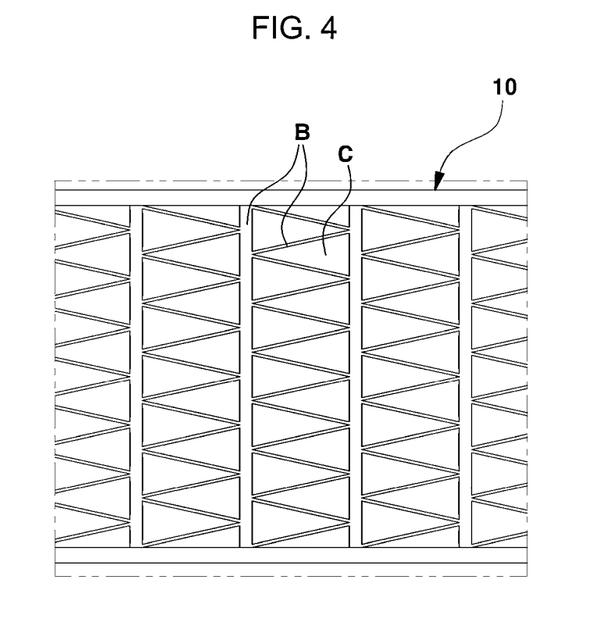
FIG. 4 is a front view exemplarily illustrating an edge pattern formed on the rear surface of the lens cover of the lighting apparatus according to various exemplary embodiments of the present disclosure to vary the thicknesses of respective parts of the lens cover.

FIG. 4 is a front view exemplarily illustrating the edge pattern 11 formed on the rear surface of the lens cover 10 of the lighting apparatus according to various exemplary embodiments of the present disclosure to vary the thicknesses of the respective portions of the lens cover 10. At the time of manufacturing the lens cover 10 by injection molding, the above-described edge pattern 11 may be obtained by forming the uneven structure in which the sharp edge-shaped depressions 13 and the peak-shaped prominences 12 are repeated on the rear portion of the lens cover 10, as described above.

When the lens cover 10 is manufactured by injection molding so that the uneven structure is formed on the rear surface of the lens cover 10 to form thickness differences among the portions of the lens cover 10, the thick portions of the lens cover 10 have relatively low total transmittance, and the thin portions of the lens cover 10 have relatively high total transmittance.

Consequently, the total transmittance of the lens cover 10 is varied depending on the position or the portion of the lens cover 10 due to the thickness differences, being configured for implementing gradation lighting in a three-dimensional pattern. For example, the lighting apparatus 9 may implement a black high-gloss surface as the front surface of the lens cover 10 in daytime, and may implement gradation lighting on the front surface of the lens cover 10 at night.

Furthermore, the lens cover 10 of the lighting apparatus 9 according to various exemplary embodiments of the present disclosure is manufactured by injection molding so that the thickness of the lens cover 10 is varied depending on the portion of the lens cover 10, which is the injection-molded product, and thus, a post process configured to implement a lighting pattern, such as masking painting or laser cutting, is not required, contrary to the surface treatment method of a conventional lens cover.

A more detailed description of the lens cover 10 will be provided after a description of the remaining elements of the lighting apparatus 9.

Among the elements of the lighting apparatus 9 according to various exemplary embodiments of the present disclosure, the light guide plate 20 may be provided to be disposed in the case 30, and to be located between the lens cover 10 and the light source 40 in the case 20.

The light guide plate 20 diffuses light emitted by light emitting elements of the light source 40 to cause the light to be uniformly transmitted by the front surface of the lighting apparatus 9, i.e., the lens cover 10, being configured for achieving uniform lighting throughout the entirety of the front surface of the lens cover 10 and thus securing uniformity in lighting. However, there are thickness differences among the portions of the lens cover 10, and thus, even when uniform light is incident upon the lens cover 10, the amount of light transmitted by the lens cover 10 is varied depending on the thickness of the portion of the lens cover 10.

In an exemplary embodiment of the present disclosure, a material for the light guide plate 20 and the role and effects of the light guide plate 20 do not differ from those of well-known light guide plates, and a detailed description thereof will thus be omitted.

The case 30 is configured to prevent light emitted by the light source 40 from leaking to the outside thereof, and is configured to assemble other elements and mount the same therein. The light guide plate 20, the light source 40 and the lens cover 10 are coupled to respective determined positions of the case 30 to be mounted therein, and the case 30 is an element configured to fix the light guide plate 20, the light source 40 and the lens cover 10 to mount the same therein.

The case 30 may include a case main body 31 provided so that the lens cover 10 may be fixedly coupled to a front surface position thereof, and configured to form a space in which the light guide plate 20 and the light source 40 are disposed, and a back cover 32 coupled to a rear surface position of the case main body 31.

The light source 40 may include a plurality of light emitting elements, and a printed circuit board (PCB) configured so that the plurality of light emitting elements is mounted thereon and a circuit for power supply to the light emitting elements is provided therein.

The light source 40 may be configured so that the plurality of light emitting elements is uniformly disposed on the front surface of the printed circuit board at predetermined intervals. The light source 40 may be coupled to the case main body 31 or the back cover 32 to be fixed thereto in the state in which the light source 40 is received in the case 30.

General light emitting diodes (LEDs) may be used as the light emitting elements provided in the light source 40 to generate and emit light, and the light source 40 may be configured so that a plurality of LEDs may be disposed and mounted on the printed circuit board.

In the lighting apparatus 9 according to various exemplary embodiments of the present disclosure, the controller 50 is configured to control operation of the light source 40 to implement a desired lighting color and pattern, and may be configured so that a circuit including a control element for controlling operation of the light emitting elements and power supply to the light emitting elements is mounted on the printed circuit board of the light source 40.

Although FIG. 1 illustrates the controller 50 provided separately from the light source 40 including the light emitting elements and the printed circuit board, the controller 50 may include a control element mounted on the printed circuit board, and in the instant case, the controller 50 may have a circuit integrated with the printed circuit board in the light source 40.

Figure 5:
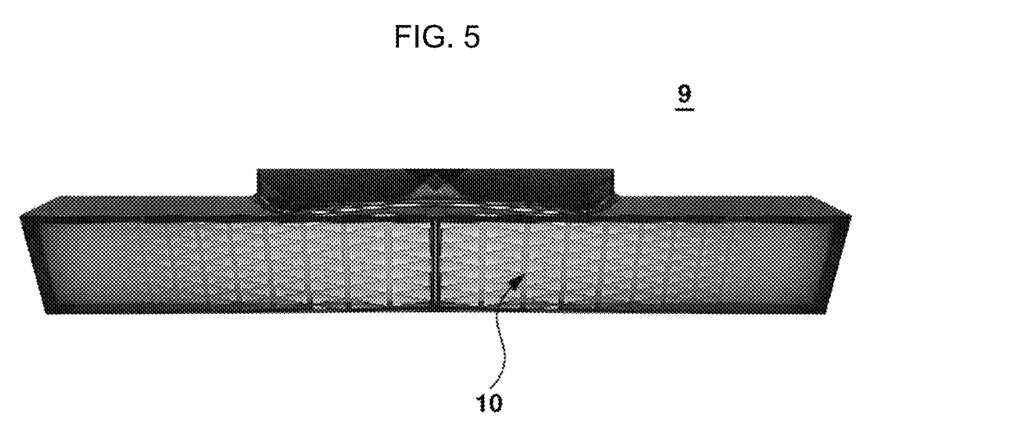
FIG. 5 is a perspective view of the lighting apparatus according to an exemplary embodiment of the present disclosure.

FIG. 5 is a perspective view of the lighting apparatus 9 according to various exemplary embodiments of the present disclosure, and illustrates one example of a lighting pattern which is visible from the outside thereof through the front surface of the lens cover 10 in the ON state of lighting apparatus 9.

As shown in the present figure, the lighting apparatus 9 may have a rectangular shape extending laterally, and may be configured to emit light in a surface emitting type through the front portion of the lens cover 10.

Furthermore, the lighting apparatus 9 may be configured so that the brightness of lighting is the maximum at the central portion of the lighting apparatus 9 and is gradually decreased from the central portion to both end portions of the lighting apparatus 9 in the lateral direction, i.e., the longitudinal direction, of the lighting apparatus 9, being configured for implementing a three-dimensional gradation lighting pattern on the front portion of the lighting apparatus 9 (i.e., the front portion of the lens cover 10).

More concretely, an embossed pattern in which fine irregularities are repeated may be formed at the front portion of the lighting apparatus 9 which is visible from the outside thereof, i.e., on the front surface of the lens cover 10.

In the instant case, in the OFF state of the lighting apparatus 9 in which the light emitting diodes (LEDs) of the light source 40 are turned off or the OFF state of the LEDs is maintained, the edge pattern 11 (in FIG. 2, FIG. 3 and FIG. 4) formed on the rear surface of the lens cover 10 is not visible, but the embossed pattern formed on the front surface of the lens cover 10 is visible from the outside.

Of course, the front surface of the lens cover 10 may be formed as a high-gloss surface without forming the embossed pattern on the front surface of the lens cover 10. In the instant case, in daytime when the lighting apparatus 9 is in the OFF state, a black high-gloss surface may be implemented on the front portion of the lighting apparatus 9 (i.e., the front portion of the lens cover 10).

Here, the edge pattern 11 (in FIG. 2, FIG. 3 and FIG. 4) formed on the rear surface of the lens cover 10 may not be visible in the dark. On the other hand, the edge pattern 11 may be visible as a three-dimensional pattern through the front surface of the lens cover 10 under light of the sun outdoors.

Furthermore, at night when the lighting apparatus 9 is turned on, as light emitted by the light source 40 is transmitted by the lens cover 10 having thickness differences, a three-dimensional gradation lighting pattern may be visible to the naked eye through the front surface of the lens cover 10 due to the edge pattern 11 formed on the rear surface of the lens cover 10.

In either case, in the OFF state of the lighting apparatus 9, the color of a material used to manufacture the lens cover 10 by injection molding, i.e., the color of the lens cover 10, is shown through the front portion of the lens cover 10. Conversely, in the ON state of the lighting apparatus 9 in which the LEDs of the light source 40 are turned on or the ON state of the LEDs is maintained, the color of lighting (i.e., the color of light) and a three-dimensional lighting pattern caused by the edge pattern 11 may be implemented through the front portion of the lens cover 10.

In the ON state of the lighting apparatus 9, as light emitted by the LEDs of the light source 40 is transmitted by the lens cover 10, the three-dimensional lighting pattern in which the bright portions and the dark portions of the lens cover 10 are seen to be visually distinguishable from each other may be implemented through the front portion of the lens cover 10, as shown in FIG. 5.

In the ON state of the lighting apparatus 9, the portions including the edge-shaped cross-sections, which are the deepest end portions of the depressions 13, on the uneven surface of the lens cover 10 manufactured to have the thickness differences through injection molding, i.e., the rear surface of the lens cover 10 including the edge pattern 11, have the smallest thickness. Furthermore, the boundaries B between the cells C on the rear surface of the lens cover 10, i.e., the portions including the peak-shaped cross-section, which are the end portions of the prominences 12, have the greatest thickness.

When light emitted by the light source 40 is transmitted by the lens cover 10 including the thickness differences among the portions of the lens cover 10, a portion of the lens cover 10 including a smaller thickness has higher total transmittance, and may thus implement brighter lighting. Concretely, the portions including the edge-shaped cross-section, which are the deepest end portions of the depressions 13, on the rear surface the lens cover 10 may implement the brightest lighting.

Conversely, a portion of the lens cover 10 including a greater thickness have lower total transmittance, and may thus implement darker lighting. Concretely, the portions including the peak-shaped cross-section, which are the end portions of the prominences 12, on the rear surface of the lens cover 10 have the greatest thickness, and may thus be seen as the darkest portions.

Referring to FIG. 5, it may be confirmed that the boundaries B between the cells C have the greatest thickness and thus the boundaries B implement dark lighting. Furthermore, when the internal portion of each of the cells C on the rear surface of the lens cover 10 has an inclined surface so that the thickness of the internal portion of each of the cells C is varied depending on the position in the internal portion of each of the cells C, the brightness of lighting may be varied depending on the position in the internal portion of each of the cells C.

As described above, due to the thickness differences among the portions of the lens cover 10, which is the injection-molded product, (i.e., a thickness variation between thick portions and thin parts) and differences in total transmittances caused by the thickness differences, a gradation lighting pattern may be implemented in the ON state of the lighting apparatus 9, and the above-described three-dimensional effect due to light of the sun may be implemented in the OFF state of the lighting apparatus 9.

Figure 6A:
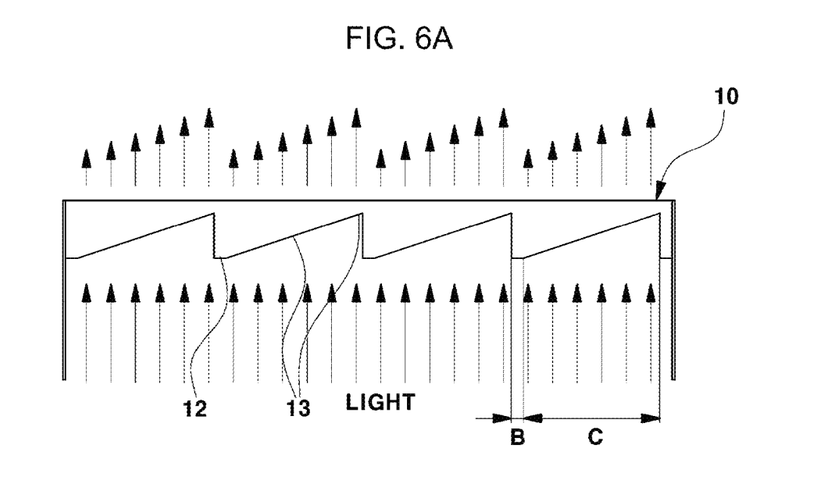
FIG. 6A and FIG. 6B are views showing the lighting states of the lighting apparatus according to various exemplary embodiments of the present disclosure and a conventional lighting apparatus, in which light is transmitted by the lens covers of the lighting apparatuses.
Figure 6B:
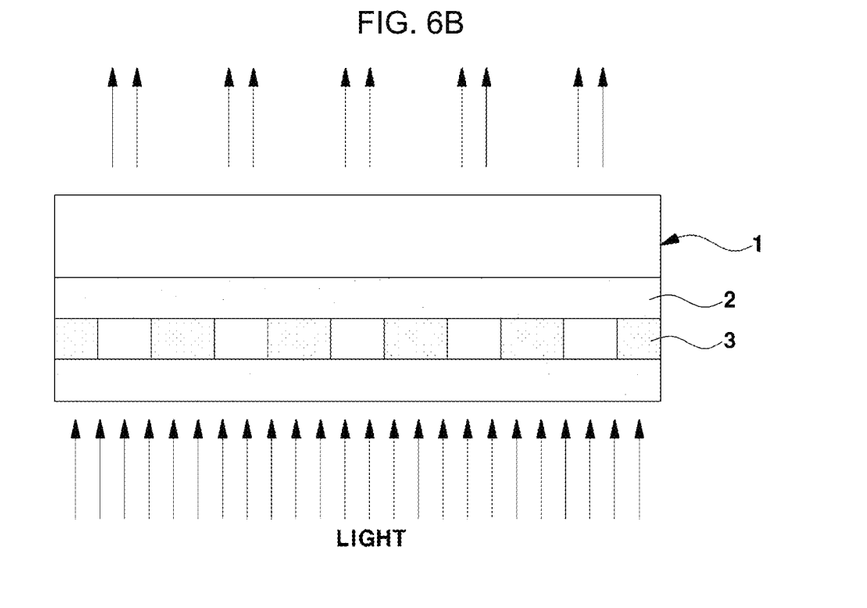
Figure 7:
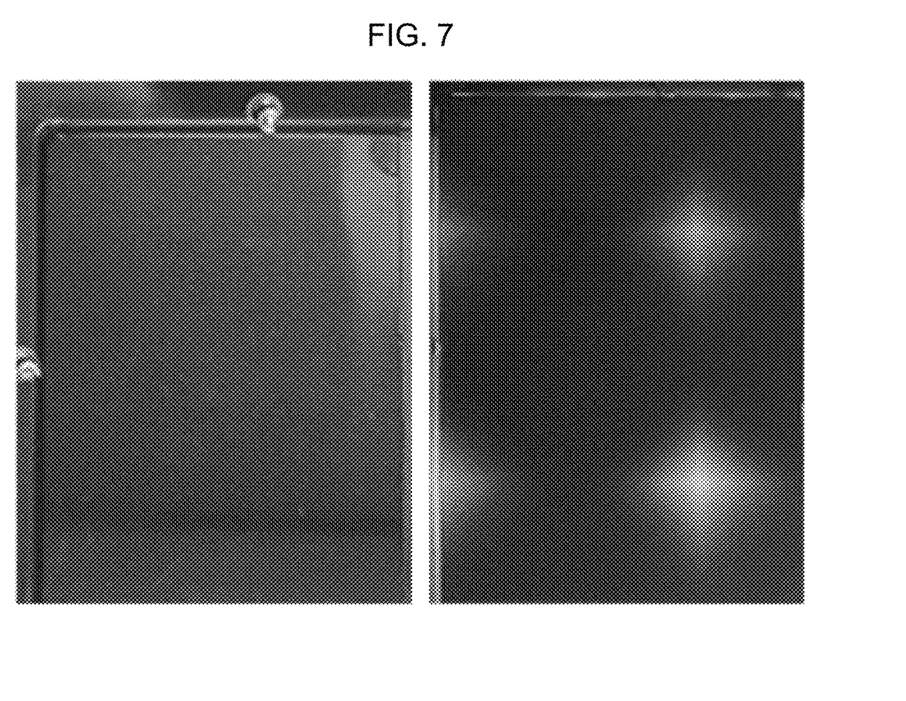
FIG. 7, FIG. 8, FIG. 9 and FIG. 10 are images showing various examples of lighting states which may be implemented by the lighting apparatus according to an exemplary embodiment of the present disclosure.
Figure 8:
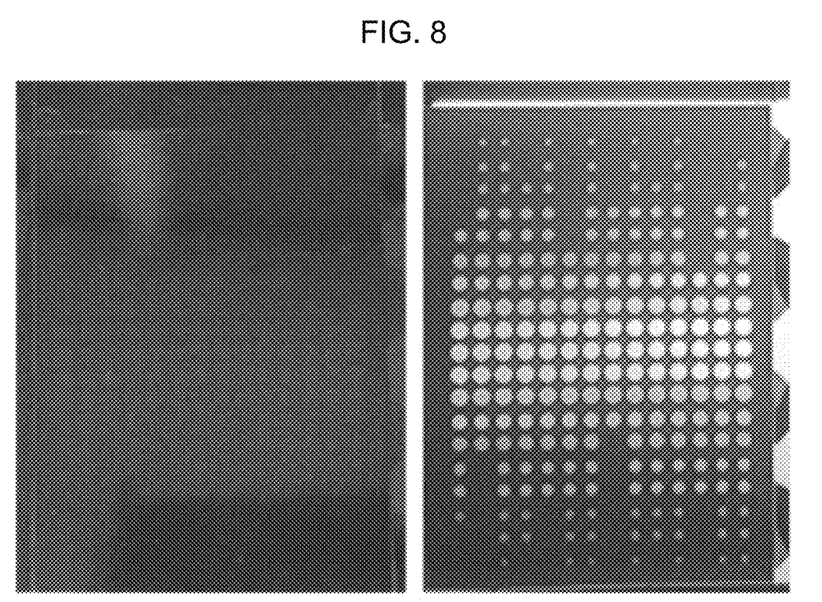
Figure 9:
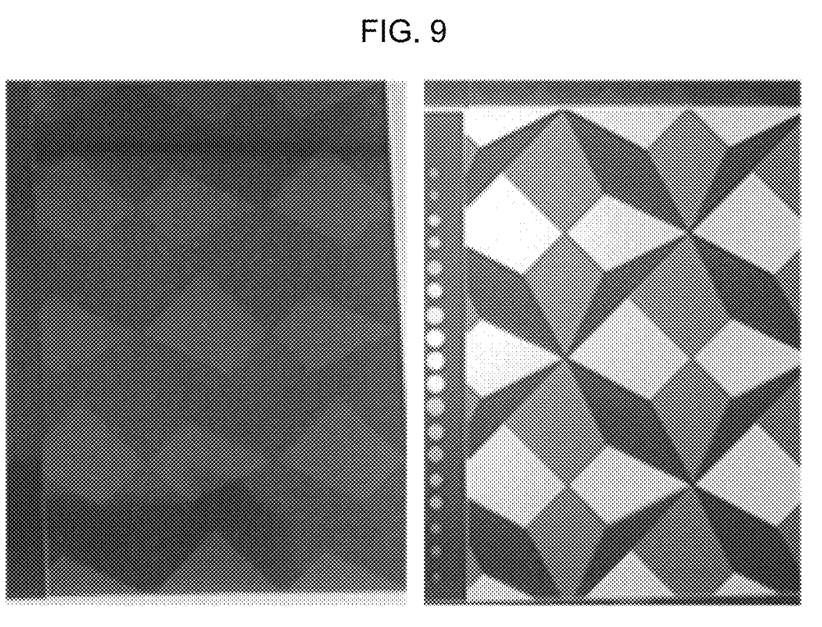
Figure 10:
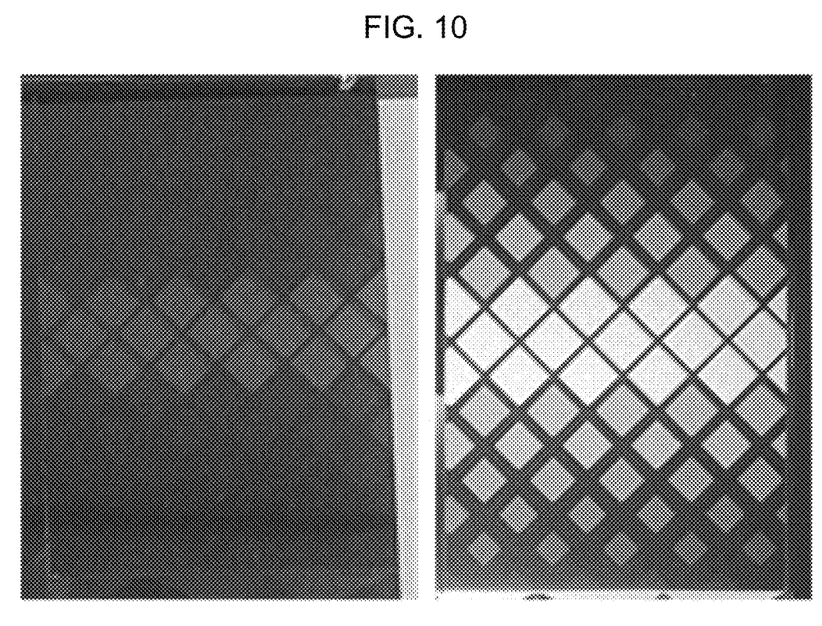

FIG. 6A and FIG. 6B are views showing the lighting states of the lighting apparatus 9 according to various exemplary embodiments of the present disclosure and a conventional lighting apparatus, implemented by light transmitted by the lens cover 10 of the lighting apparatus 9 according to various exemplary embodiments of the present disclosure and a lens cover 1 of the conventional lighting apparatus. In these figures, the length of an arrow indicates the brightness of lighting (i.e., the amount of the transmitted light), and as the length of the arrow increases, the brightness of lighting through the front portion of the lens cover increases.

Referring to FIG. 6A, light emitted by the light source 40 (in FIG. 1) is transmitted by the light guide plate 20 (in FIG. 1), and is then incident upon the rear surface of the lens cover 10. Here, light including uniform brightness is incident upon the rear surface of the lens cover 10 by the light guide plate 20 but, after being transmitted by the lens cover 10, a lighting pattern including brightness varied depending on the thickness of the lens cover 10 is implemented through the front portion of the lens cover 10.

FIG. 6B shows the sectional structure of the lens cover 1 of the conventional lighting apparatus, in which a separate layer 3 configured to implement a lighting pattern is stacked on the rear surface, i.e., the internal surface, of the lens cover 1 formed of a transparent material by a transparent primer 2. The layer 3 has transmissive areas and non-transmissive areas, and may be provided through a post-treatment process, such as printing, deposition, laser cutting or the like, after manufacture of the lens cover 1 by injection molding.

FIG. 7, FIG. 8, FIG. 9 and FIG. 10 are images showing various examples of lighting states which may be implemented by the lighting apparatus 9 according to various exemplary embodiments of the present disclosure. As shown in these figures, the lighting apparatus 9 according to various exemplary embodiments of the present disclosure may implement a three-dimensional gradation lighting pattern. Various lighting patterns may be implemented depending on the shape of the edge pattern formed on the rear portion of the lens cover 10.

Hereinafter, a material used to manufacture the lens cover of the lighting apparatus according to various exemplary embodiments of the present disclosure by injection molding will be described.

In the lighting apparatus according to various exemplary embodiments of the present disclosure, a translucent lens cover is employed to implement a hidden-type three-dimensional pattern and gradation lighting.

Figure 11:
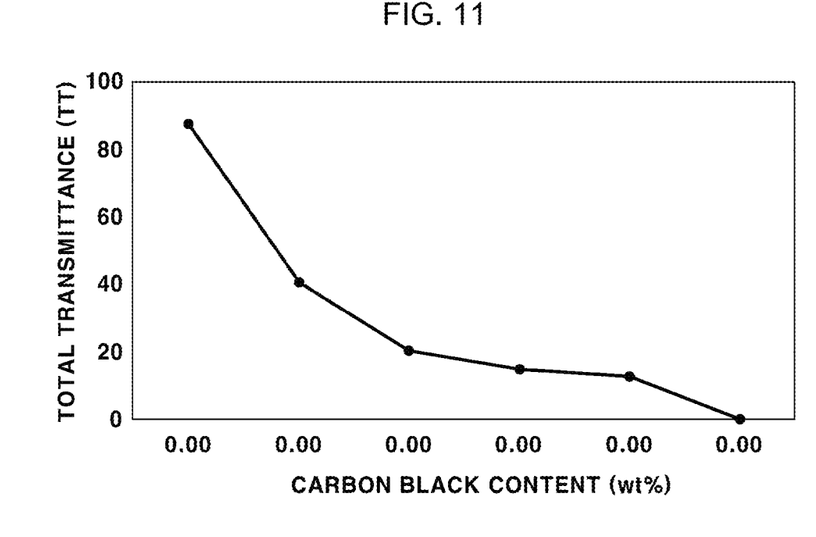
FIG. 11 is a graph representing change in total transmittance of the lens cover depending on the content of carbon black in a material for the lens cover.
Figure 12:
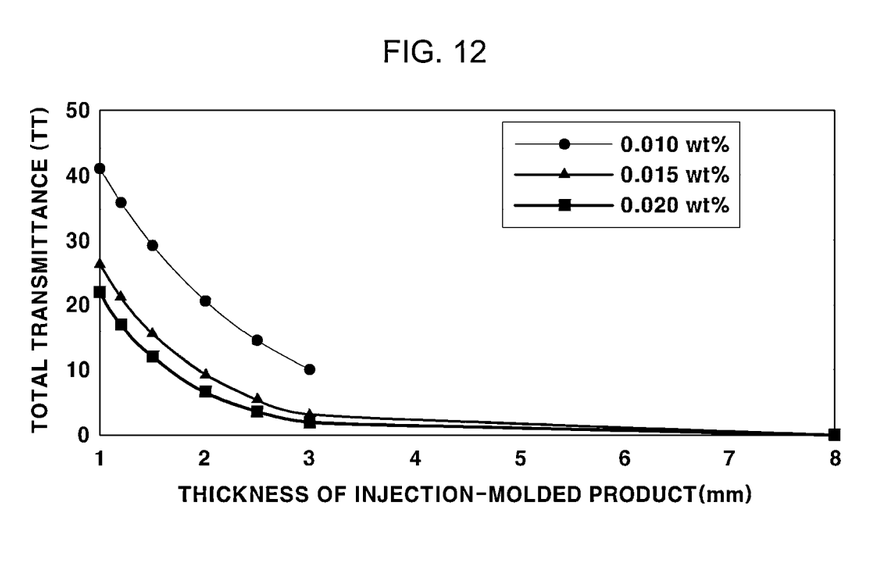
FIG. 12 is a graph representing differences in total transmittance among lens covers including respective carbon black contents depending on the thickness of an injection-molded product provided as the lens covers.

FIG. 11 is a graph representing change in total transmittance of the lens cover depending on the content of carbon black in the material for the lens cover, and FIG. 12 is a graph representing differences in total transmittance among lens covers including respective carbon black contents depending on the thickness of an injection-molded product provided as the lens covers.

A synthetic resin which has high light transmittance and a color of which is easily adjusted and controlled may be used as the material for the lens cover, and for example, polycarbonate (PC) or poly(methyl methacrylate) (PMMA) may be used.

Furthermore, the lens cover according to an exemplary embodiment of the present disclosure may be manufactured using a material obtained by adding a black pigment configured to implement a hidden-type pattern to a transparent material, such as PC or PMMA, and is manufactured to have thickness variations in the thickness direction on the rear surface of an injection molded product provided as the lens cover.

The amount of light transmitted by the lens cover and discharged from the front surface of the lens cover may be controlled using the total transmittance of the material used to manufacture the lens cover by injection molding and thickness variations on the rear surface of the injection-molded product, and accordingly, a three-dimensional pattern and a gradation effect may be implemented.

In various exemplary embodiments of the present disclosure, the lens cover may be formed through injection molding using a material obtained by adding a black pigment, such as carbon black, metal powder (for example, Al powder), other colored pigments, etc. To the synthetic resin used as the material for the lens cover.

The gradation effect in the lighting apparatus according to an exemplary embodiment of the present disclosure is determined by the content of the carbon black included in the material for the lens cover and the thickness of the lens cover, which is the injection molded product, the total transmittance of the injection-molded product is decreased and thus the thickness of the injection molded product may be decreased as the content of the carbon black is increased, and the total transmittance of the injection-molded product is increased and thus the thickness of the injection molded product may be increased as the content of the carbon black is decreased.

In the lighting apparatus according to an exemplary embodiment of the present disclosure, the total transmittance of the lens cover may be 10-70%, and when the total transmittance of the lens cover exceeds 70%, the inside of the lens cover of the lighting apparatus may be easily seen through and thus it is difficult to implement the hidden-type pattern even though the thickness of the injection-molded product provided as the lens cover is great. Furthermore, when the total transmittance of the lens cover is less than 10%, it is difficult to implement the gradation effect even though the thickness of the injection-molded product provided as the lens cover is small.

Furthermore, in manufacture of the lens cover, the content of the carbon black may be 0.01-0.5 wt % with respect to the total weight of a material composition for the lens cover, and when the content of the carbon black is less than 0.01 wt %, the total transmittance of the injection-molded product is 40% on the assumption that the thickness of the injection-molded product is 1 mm, and thus, it is difficult to hide the lighting apparatus indoors. That is, it is difficult to implement a hidden-type lighting apparatus.

Conversely, when the content of the carbon black exceeds 0.5 wt %, the total transmittance of the injection-molded product is close to 0% on the assumption that the thickness of the injection-molded product is 1 mm, the lens cover transmits a portion of light in the ON state of the lighting apparatus, but the total transmittance of the injection-molded product is too low to implement a desired gradation lighting pattern.

Furthermore, the thickness of the lens cover manufactured by injection molding may be 1-8 mm in consideration of the total transmittance and moldability of the lens cover. When the thickness of the injection-molded product is less than 1 mm, the total transmittance of the injection-molded product is excessively increased, and thus, it is difficult to control lighting, and a problem in flow of a molten resin arises during injection molding.

On the other hand, when the thickness of the lens cover manufactured by injection molding exceeds 8 mm, the external appearance of the lens cover may deteriorate due to surface sinks formed during injection molding, and a defective product may easily occur.

The above-described lighting apparatus according to various exemplary embodiments of the present disclosure is a hidden-type lighting apparatus which may implement a three-dimensional gradation lighting pattern, and may be provided at various positions of a vehicle.

For example, the lighting apparatus according to various exemplary embodiments of the present disclosure may be provided and used as an external lighting apparatus for vehicles, such as a head lamp which radiates light ahead of a vehicle, a rear lamp which radiates light behind a vehicle, or a side lamp mounted on the side surface of a vehicle body, or may be provided on the roof of a vehicle as an external lighting apparatus.

In addition to the external lighting apparatus for vehicles, the lighting apparatus according to various exemplary embodiments of the present disclosure may be used as an internal lighting apparatus for vehicles which is provided on a crash pad, a garnish, such as a door garish, or the like.

Furthermore, the lighting apparatus according to various exemplary embodiments of the present disclosure may be mounted not only outside and inside an electrified vehicle, such as an electric vehicle, a fuel cell electric vehicle or a hybrid vehicle, but also outside and inside an internal combustion engine vehicle, and may implement lighting images that fit various user environmental conditions, such as a simple type of lighting, a welcome function, a state of charge (SOC) display function, etc.

Moreover, the lighting apparatus according to various exemplary embodiments of the present disclosure includes the lens cover configured to implement a three-dimensional pattern, gradation lighting and hidden-type lighting, and the lens cover does not require a post-treatment process to implement a pattern of lighting during a manufacturing process contrary to lighting portions to which a surface treatment method, such as painting, plating, film laminating, use of a real material, or the like, is applied.

In a process of manufacturing the conventional lens cover, an additional process, such as selective coating or selective removal of a surface-treated area (by laser cutting or punching), is required to divide light transmissive areas and light non-transmissive areas from each other. On the other hand, in manufacture of the lens cover according to an exemplary embodiment of the present disclosure, no additional process is required.

Furthermore, to implement hidden-type lighting through the conventional lens cover, a surface coating layer which may transmit light is required, and thus, when plating and a real material are used, it is difficult to implement the hidden-type lighting. Here, the hidden-type lighting is referred to as lighting which has difficulty confirming presence of the lighting in external appearance in the OFF state of the lighting, and is implemented only in the ON state of the lighting.

Furthermore, when the total transmittance of the lens cover according to an exemplary embodiment of the present disclosure, i.e., the injection-molded product, is adjusted, the lighting apparatus according to an exemplary embodiment of the present disclosure may implement a three-dimensional effect due to the depth of a pattern formed on the lens cover even in the OFF state of the lighting apparatus. Furthermore, the lighting apparatus according to an exemplary embodiment of the present disclosure may implement gradations of a lighting color by controlling pixels of a light-emitting diode (LED) module in the light source, but the conventional lighting apparatus manufactured using a surface treatment method has difficulty implementing gradations of a lighting color.

The lens cover of the lighting apparatus according to an exemplary embodiment of the present disclosure configured to implement a hidden-type three-dimensional pattern and gradation lighting may implement (1) the three-dimensional effect, (2) gradations of the lighting color, and (3) the hidden-type lighting using the total transmittance of the material used to manufacture the lens cover by injection molding and thickness variations of the lens cover which is the injection-molded product.

Furthermore, when a pigment, such as carbon black, is added to the transparent material used to manufacture the lens cover by injection molding to show the lighting color or to hide the pattern, the total transmittance of the lens cover may be changed depending on the content of the pigment and may be adjusted depending on the thickness of the injection-molded product, and thereby, light transmissive areas and light non-transmissive areas may be controlled without selective coating or removal of a surface-treated layer.

As is apparent from the above description, a lighting apparatus for vehicles and a method of manufacturing the same according to an exemplary embodiment of the present disclosure may implement lighting configured to provide a unique and beautiful image of an electrified vehicle and aesthetic sensibility.

Furthermore, the lighting apparatus for vehicles may be provided outside or inside a vehicle, may improve a degree of freedom in design, may be manufactured through a simple process, and may implement hidden-type three-dimensional pattern gradation lighting.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A lighting apparatus for vehicles, the lighting apparatus comprising:
   a light source configured to emit light;
   a light guide plate configured to diffuse the light emitted by the light source; and
   a lens cover configured to transmit the light diffused by the light guide plate and to emit the light transmitted directly from the light guide plate forwards of the lens cover,
   wherein an internal surface of the lens cover, onto which the light diffused by the light guide plate is directly projected, includes a plurality of prominences and depressions formed therein in a regular pattern entirely to include varied thicknesses depending on positions thereof so that amount of the light transmitted by the lens cover varies thereby, and
   wherein the lighting apparatus is configured to implement a black high-gloss surface as a front surface of the lens cover in daytime, and implement gradation lighting on the front surface of the lens cover at night.

2. The lighting apparatus of claim 1, wherein the lens cover is formed of a material including a light-transmissive synthetic resin and a black pigment.

3. The lighting apparatus of claim 2, wherein a total transmittance of the lens cover is 10% to 70%.

4. The lighting apparatus of claim 2,
   wherein the black pigment is carbon black, and
   wherein a content of the carbon black is 0.01 wt % to 0.5 wt % with respect to a total weight of the material used to manufacture the lens cover by injection molding.

5. The lighting apparatus of claim 1, wherein the lens cover is manufactured by injection molding.

6. The lighting apparatus of claim 1,
   wherein an edge pattern including repetitions of the plurality of protrusions and depressions is formed on the internal surface of the lens cover, and
   wherein at least one of the prominences or the depressions includes a sharp edge-shaped cross section.

7. The lighting apparatus of claim 6, wherein deepest end portions of the depressions include the sharp edge-shaped cross section.

8. The lighting apparatus of claim 6, wherein protruding end portions of the prominences include a sharp peak-shaped cross section, or include a peak-shaped cross section including a flat surface so that the prominences have a constant thickness.

9. The lighting apparatus of claim 6,
   wherein the internal surface of the lens cover includes a plurality of regions, and boundaries between neighboring regions among the plurality of regions of the internal surface of the lens cover correspond to end portions of the prominences including a greatest thickness of the lens cover, and
   wherein the lens cover has different thicknesses depending on a position in an internal portion of each of the regions.

10. The lighting apparatus of claim 9, wherein the internal portion of each of the regions includes an inclined surface on a cross section thereof to have different thicknesses depending on the position in the internal portion of each of the regions.

11. A method of manufacturing a lighting apparatus for vehicle, the method comprising:
    manufacturing a lens cover by injection molding;
    disposing a light guide plate configured to diffuse light emitted by a light source configured to emit the light, in front of the light source; and
    disposing the lens cover configured to transmit the light diffused by the light guide plate and to emit the light transmitted directly from the light guide plate forwards of the lens cover, in front of the light guide plate,
    wherein, in manufacturing the lens cover, the lens cover is manufactured by injection molding so that irregularities are formed entirely on an internal surface of the lens cover configured so that the light having passed through the light guide plate is incident thereupon, to vary an amount of the light transmitted by the lens cover manufactured by the injection molding depending on a position on the lens cover or a portion of the lens cover, and
    wherein the lighting apparatus is configured to implement a black high-gloss surface as a front surface of the lens cover in daytime, and implement gradation lighting on the front surface of the lens cover at night.

12. The method of claim 11, wherein, in manufacturing the lens cover, the lens cover is manufactured by the injection molding using a material including a synthetic resin configured to be formed into a light-transmissive injection-molded product, and a black pigment.

13. The method of claim 12, wherein, in manufacturing the lens cover, the lens cover is manufactured by the injection molding to have total transmittance of 10% to 70%.

14. The method of claim 12,
wherein the black pigment is carbon black, and
wherein a content of the carbon black is 0.01 wt % to 0.5 wt % with respect to a total weight of the material used to manufacture the lens cover by the injection molding.

15. The method of claim 11, wherein, in manufacturing the lens cover, the lens cover is manufactured by the injection molding so that:
an edge pattern configured so that the irregularities are repeated is formed on the internal surface of the lens cover;
the edge pattern includes a structure configured so that prominences including a shape configured to protrude from an internal portion of the lens cover and depressions including a shape recessed between neighboring ones of the prominences are repeated; and
at least one of the prominences or the depressions includes a sharp edge-shaped cross section.

16. The method of claim 15, wherein deepest end portions of the depressions include the sharp edge-shaped cross section.

17. The method of claim 15, wherein protruding end portions of the prominences include a sharp peak-shaped cross section, or include a peak-shaped cross section including a flat surface so that the prominences have a constant thickness.

18. The method of claim 15, wherein, in manufacturing the lens cover, the lens cover is manufactured by the injection molding so that:
the internal surface of the lens cover includes a plurality of regions, and boundaries between neighboring regions among the plurality of regions of the internal surface of the lens cover correspond to end portions of the prominences including a greatest thickness of the lens cover; and
the lens cover has different thicknesses depending on a position in an internal portion of each of the regions.

19. The method of claim 18, wherein the internal portion of each of the regions includes an inclined surface on a cross section thereof to have different thicknesses depending on the position in the internal portion of each of the regions.

20. A lighting apparatus for vehicles, the lighting apparatus comprising:
a light source configured to emit light;
a light guide plate configured to diffuse the light emitted by the light source; and
a lens cover configured to transmit the light diffused by the light guide plate and to emit the light forwards of the lens cover,
wherein an internal surface of the lens cover, onto which the light diffused by the light guide plate is projected, includes a plurality of prominences and depressions formed therein in a regular pattern entirely to include varied thicknesses depending on positions thereof so that amount of the light transmitted by the lens cover varies thereby,
wherein a material for the lens cover includes pigments and a total transmittance of the lens cover is determined by a content of the pigments included in the material for the lens cover and the thickness of the lens cover such that gradation effect appears in the lighting apparatus, and
wherein the lighting apparatus is configured to implement a black high-gloss surface as a front surface of the lens cover in daytime, and implement gradation lighting on the front surface of the lens cover at night.

* * * * *

UNITED STATES PATENT AND TRADEMARK OFFICE
CERTIFICATE OF CORRECTION

| | |
|---|---|
| PATENT NO. | : 12,085,250 B2 |
| APPLICATION NO. | : 18/196315 |
| DATED | : September 10, 2024 |
| INVENTOR(S) | : Woo Chul Jung et al. |

It is certified that error appears in the above-identified patent and that said Letters Patent is hereby corrected as shown below:

On the Title Page

Item (54) and in the Specification Column 1, Line 1:
Change: LIGHTING APPARATUS FOR VEHICLES AND METHOD OF MANUFACTURING THE SAME PRELIMINARY CLASS
To: LIGHTING APPARATUS FOR VEHICLES AND METHOD OF MANUFACTURING THE SAME

Signed and Sealed this
Eighth Day of October, 2024

Katherine Kelly Vidal
*Director of the United States Patent and Trademark Office*